US012704073B2

(12) United States Patent
Torres et al.

(10) Patent No.: US 12,704,073 B2

(45) Date of Patent: Aug. 11, 2026

(54) CENTER TIE ROTOR ANNULAR SEAL

(71) Applicant: RTX Corporation, Farmington, CT (US)

(72) Inventors: Luis Manuel Torres, Brooklyn, NY (US); Matthew E. Bintz, West Hartford, CT (US); Fadi S. Maalouf, East Hampton, CT (US); Ryan Hamilton Quinn, Berlin, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/826,853

(22) Filed: Sep. 6, 2024

(65) Prior Publication Data

US 2026/0071551 A1 Mar. 12, 2026

(51) Int. Cl.
*F01D 11/00* (2006.01)
*F01D 5/02* (2006.01)

(52) U.S. Cl.
CPC .............. *F01D 11/005* (2013.01); *F01D 5/02* (2013.01); *F05D 2230/60* (2013.01)

(58) Field of Classification Search
CPC ..................................................... F01D 11/005
See application file for complete search history.

(56) References Cited

U.S. PATENT DOCUMENTS

| | | | |
|---|---|---|---|
| 2,804,323 A | 8/1957 | Morley | |
| 4,737,076 A | 4/1988 | Bonner et al. | |
| 4,750,746 A | 6/1988 | Boudot et al. | |
| 5,054,996 A | 10/1991 | Carreno | |
| 5,288,210 A | 2/1994 | Albrecht et al. | |
| 6,250,883 B1 | 6/2001 | Robinson et al. | |
| 6,666,645 B1 | 12/2003 | Arilla et al. | |
| 8,152,471 B2 * | 4/2012 | Pichel | F01D 5/025 416/198 A |
| 9,410,427 B2 | 8/2016 | Giannakopoulos | |
| 10,260,524 B2 | 4/2019 | Hiester | |
| 10,344,596 B2 | 7/2019 | Whitten et al. | |
| 10,774,742 B2 | 9/2020 | Giannakopoulos et al. | |

(Continued)

FOREIGN PATENT DOCUMENTS

| | | |
|---|---|---|
| EP | 3546700 A1 | 10/2019 |
| EP | 3708773 A2 | 9/2020 |

OTHER PUBLICATIONS

European Search Report dated Nov. 3, 2025 for European Patent Application No. 25182835.6.

(Continued)

*Primary Examiner* — Katheryn A Malatek

(74) *Attorney, Agent, or Firm* — Bachman & LaPointe, P.C.

(57) ABSTRACT

A turbine engine rotor has a central shaft and a disk stack having a plurality of disks encircling the shaft. A seal has a first member having, in central axial cross-section: a rearwardly-open channel receiving a portion of one of the disks; a sleeve extending rearward from the channel and between the disk and the shaft; and a portion extending radially inward from the sleeve and having a forward surface. The seal has a second member having, in central axial cross-section: a forward-facing surface contacting an aft-facing surface of the shaft; and a rear-facing surface contacting the forward surface of said portion extending radially inward from the sleeve.

19 Claims, 7 Drawing Sheets

(56) References Cited

U.S. PATENT DOCUMENTS

| | | | | |
|---|---|---|---|---|
| 10,808,627 | B2 | 10/2020 | Behling et al. | |
| 10,954,861 | B2 | 3/2021 | Bintz | |
| 11,067,090 | B1 | 7/2021 | Giannakopoulos | |
| 11,506,071 | B2 | 11/2022 | Maalouf | |
| 12,123,305 | B2 | 10/2024 | Alecu et al. | |
| 2007/0107219 | A1 | 5/2007 | Suciu et al. | |
| 2007/0286733 | A1 | 12/2007 | Bouchard | |
| 2009/0016886 | A1 | 1/2009 | Pichel | |
| 2011/0280735 | A1* | 11/2011 | Dakowski | F02C 7/18 416/97 R |
| 2013/0323010 | A1* | 12/2013 | Mosley | F01D 25/12 416/97 R |
| 2013/0323077 | A1 | 12/2013 | Giannakopoulos | |
| 2016/0215792 | A1 | 7/2016 | Hiester | |
| 2016/0362982 | A1* | 12/2016 | Judet | F02C 7/36 |
| 2019/0292995 | A1 | 9/2019 | Behling et al. | |
| 2020/0056506 | A1* | 2/2020 | Stoyanov | F01D 25/183 |
| 2020/0072084 | A1 | 3/2020 | Blaney et al. | |
| 2020/0291861 | A1 | 9/2020 | Bintz | |
| 2022/0282631 | A1* | 9/2022 | Maalouf | F01D 5/025 |
| 2024/0167389 | A1 | 5/2024 | Alecu et al. | |
| 2025/0389200 | A1 | 12/2025 | Torres et al. | |

OTHER PUBLICATIONS

US Office Action dated Nov. 20, 2025 for U.S. Appl. No. 18/747,972.

European Search Report dated Feb. 16, 2026 for European Patent Application No. 25200599.6.

* cited by examiner

CENTER TIE ROTOR ANNULAR SEAL

BACKGROUND

The disclosure relates to gas turbine engines. More particularly, the disclosure relates to disk-to-shaft sealing in center-tie rotors.

Gas turbine engines (used in propulsion and power applications and broadly inclusive of turbojets, turboprops, turbofans, turboshafts, industrial gas turbines, and the like) often feature center-tie rotors wherein a shaft passes centrally through a rotor disk stack with engagement between the shaft and stack such that the shaft is held in tension and the stack is held in compression.

Operational stresses (including thermal stresses and load stresses) may cause excursions between disks and shaft. Accordingly, there often are seals between disk and shaft. In an example high pressure compressor (HPC) rotor in a multi-spool engine an example sealing system involves a piston seal ring (PSR) held in an outer diameter groove in the shaft and interfacing with an inner diameter (ID) surface of a disk bore. The seal may isolate an inter-disk space aft thereof that's used to pass air radially inward to then pass aft to the turbine section for turbine cooling. Additionally, a diverted airflow may pass radially through holes in the shaft from forward of the seal to pass forward and/or aft within the shaft to provide cooling to other parts of the engine, such as the bearing compartment buffer system.

SUMMARY

One aspect of the disclosure involves a turbine engine rotor comprising: a central shaft; and a disk stack having a plurality of disks encircling the shaft. A seal has a first member having, in central axial cross-section: a rearwardly-open channel receiving a portion of one of the disks; a sleeve extending rearward from the channel and between the disk and the shaft; and a portion extending radially inward from the sleeve and having a forward surface. The seal has a second member having, in central axial cross-section: a forward-facing surface contacting an aft-facing surface of the shaft; and a rear-facing surface contacting the forward surface of said portion extending radially inward from the sleeve.

In a further example of any of the foregoing, additionally and/or alternatively, the restraint is via contacting an aft facing surface of the shaft.

In a further example of any of the foregoing, additionally and/or alternatively, the shaft has a plurality of through-holes axially within a span of the sleeve.

In a further example of any of the foregoing, additionally and/or alternatively, the shaft is under axial tension, the seal first member is under axial tension, and the seal second member is under axial compression.

In a further example of any of the foregoing, additionally and/or alternatively, a rear face of a radial web of the channel contacts the one disk.

In a further example of any of the foregoing, additionally and/or alternatively, an inner diameter face of an outer diameter wall of the channel contacts the disk.

In a further example of any of the foregoing, additionally and/or alternatively, the second member rear facing surface is on a second member sleeve portion and the second member forward facing surface is on a second member flange extending radially inward from the second member sleeve portion and in radial interference fit with the shaft.

In a further example of any of the foregoing, additionally and/or alternatively, the second member sleeve portion has a section forward of the second member flange and not in radial interference with the shaft.

In a further example of any of the foregoing, additionally and/or alternatively, each of the seal first member and second member is a non-split full annulus.

A further aspect of the disclosure involves a gas turbine engine including the turbine engine rotor. The rotor is a high pressure compressor rotor and further comprises: a high pressure turbine rotor co-spooled with the high pressure compressor rotor on a high spool; a low spool comprising a low pressure compressor rotor and a low pressure turbine rotor; a combustor; and a gaspath sequentially through the low pressure compressor, high pressure compressor, combustor, high pressure turbine, and low pressure turbine.

A further aspect of the disclosure involves a method for assembling the turbine engine rotor, the method comprising: assembling the seal second member to the shaft; assembling a forward plurality of the disks to each other to form a forward substack; assembling the forward substack to the shaft; assembling a rearward plurality of the disks to each other and the forward substack and shaft, including assembling the seal first member to said one disk being a forward-most disk of the rearward plurality, to form a rearward substack including said one disk; and stretching the shaft to draw the seal to bear against the one disk.

In a further example of any of the foregoing, additionally and/or alternatively, the assembling the seal second member to the shaft comprises radial thermal interference fitting.

In a further example of any of the foregoing, additionally and/or alternatively, the assembling the rearward plurality of the disks to each other and the forward substack and shaft comprises: said assembling the seal first member to said one disk followed by sequential installation of the rearward plurality of disks to the preassembled forward substack and shaft; and the assembling the rearward plurality of the disks to each other and the forward substack and shaft comprises thermally expanding the seal first member to receive the received portion of the one disk.

A further aspect of the disclosure involves a method for using the turbine engine rotor, the method comprising: driving rotation of the rotor; and the driving increasing a radial contact pressure between an inner diameter face of an outer diameter wall of the rearwardly-open channel and the received portion of the one of the disks.

A further example of any of the foregoing may additionally and/or alternatively include the inner piece and the outer piece radially flexing to accommodate radial expansion of said one disk relative to the shaft.

A further aspect of the disclosure involves a turbine engine rotor comprising: a central shaft; and a disk stack having a plurality of disks encircling the shaft and held in compression by tension in the shaft. The rotor further comprises means for sealing between the shaft and a disk of the disk stack and applying axial bias between the shaft and the disk, the means comprising an inner piece and an outer piece, the inner piece extending aft from the shaft to a junction with the outer piece and the outer piece extending forward from the junction with the inner piece to a junction with said disk.

In a further example of any of the foregoing, additionally and/or alternatively, one or more of: the rotor is a high pressure compressor rotor of a multi-spool engine; the outer piece comprises a sleeve passing between an inner diameter surface of the disk and the shaft and axially overlapping a circumferential array of vent holes in the shaft; the axial bias draws said disk rearward; and the means provides an inward radial tension on the disk increasing with rotational speed.

A further aspect of the disclosure involves a turbine engine rotor seal comprising a two-piece metallic body encircling a central longitudinal axis an outer piece and an inner piece. The outer piece has in central longitudinal half section: a first end and a second end; channel at the first end open axially toward the second end; a sleeve extending from the channel; and a portion extending radially inward from the sleeve and having a first surface facing toward the first end. The inner piece has in central longitudinal half section: a sleeve having a first end and a second end, the sleeve second end contacting said first surface; and a portion extending radially inward from the inner piece sleeve.

In a further example of any of the foregoing, additionally and/or alternatively, the inner piece and the outer piece are nickel-based (e.g., nickel as a largest by weight elemental component).

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

As is discussed further below, a conventional split ring PSR may be replaced by a non-split seal whose sealing engagement places it under axial tension between the shaft and the disk bore. The disk bore is a generally radially inboard portion of a disk protuberant in central axial cross-section with a thinner web extending radially outward to a disk rim which may bear the associated circumferential array of blade airfoils. These may be in the form of separate blades having attachment roots received in slots in the rim or may be blades of an integrally-bladed (e.g., single-piece) rotor. The bore functions to resist outward radial centrifugal pull on the blades in operation. The non-split seal may avoid or reduce air flow asymmetries and associated deformations and vibrations.

As is discussed further below, the action of the seal may essentially create a step discontinuity in the disk-to-disk axial compressive force in the rotor stack. This provides a higher axial engagement force aft of the particular disk than forward thereof.

Figure 6:
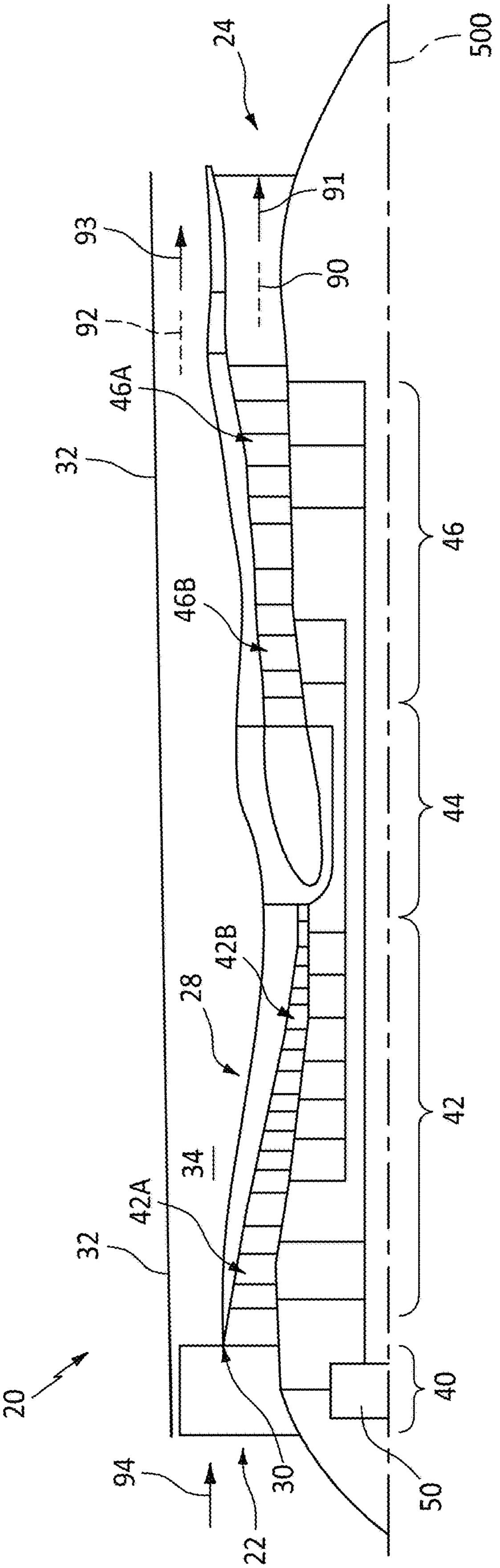
FIG. 6 (PRIOR ART)
FIG. 6 is a schematic half section of a turbofan engine.

FIG. 6 shows a gas turbine engine 20. As is discussed below, the engine is further illustrated as a schematic modification of a baseline existing engine. FIG. 6 schematically shows the example gas turbine engine 20 as a turbofan engine having a centerline or central longitudinal axis 500 and extending from an upstream end at an inlet 22 to a downstream end at an outlet 24. The example engine schematically includes a core flowpath or gaspath 90 passing a core flow 91 and a bypass flowpath 92 passing a bypass flow 93. The core flow and bypass flow are initially formed by respective portions of a combined inlet airflow 94 divided at a splitter 30. Thus, the example core flow starts out as air and downstream of the combustor comprises combustion products as combustion gas.

A core case (inner diameter (ID) case) or other structure 28 divides the core flowpath from the bypass flowpath. The bypass flowpath is, in turn, surrounded by an outer case (outer diameter (OD) case) 32 which, depending upon implementation, may be a fan case. A bypass duct 34 is configured radially between the ID case and OD case. From upstream to downstream, the engine includes a fan section 40 having one or more fan blade stages, a compressor 42 having one or more sections 42A, 42B each having one or more blade stages, a combustor 44 (e.g., annular, can type, or reverse flow), and a turbine 46 again having one or more sections 46A, 46B each having one or more blade stages. For example, many so called two-spool engines have two compressor sections (low pressure 42A and high pressure 42B) and two turbine sections (high pressure 46B and low pressure 46A) with each turbine section driving a respective associated compressor section and the low pressure downstream turbine section 46A also driving the fan (optionally via a gear reduction 50). Yet other arrangements are possible.

Various illustrated and non-illustrated features of the engine may be otherwise conventional including basic control hardware, programming, and use and manufacture methods.

Figure 1:
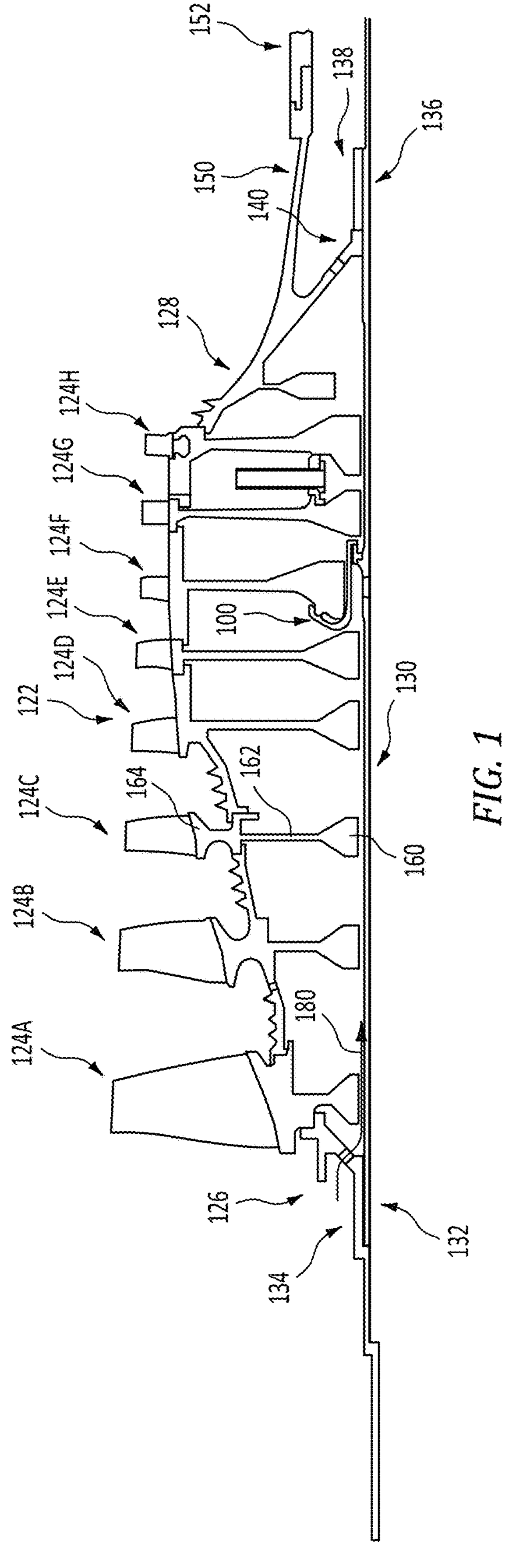
FIG. 1 is a half sectional view of a high pressure compressor (HPC) rotor.

FIG. 1 shows a seal 100 in the HPC rotor 122. The example rotor comprises a stack of disks 124A-124H. In this particular example, disks 124A-124G are known as "integrally-bladed rotors" (IBR) or "bladed disks" (blisks); whereas, the disk 124H has a circumferential array of blades mounted at the outer rim of the disk. The various disks have spacers extending fore or aft to mate with adjacent disks. FIG. 1 shows some of these spacers having radially inwardly open/facing distal shoulder surfaces receiving shoulders of the adjacent disk whereas others have radially outwardly open/facing shoulder surfaces. For example, the disk 124B has a forward spacer with a radially inwardly open shoulder and a rearward spacer with a radially outwardly open shoulder. Some of the spacers have radially outwardly protruding knife edges for cooperating with abradable material at inboard/inner platforms or shrouds of vane stages to create respective knife edge sealing systems.

The disk stack is held in axial compression between a forward hub 126 and an aft or rearward hub 128 to form a rotor stack. The term "rotor" is often interchangeably used to identify anything from a single disk (e.g., as in IBR noted above), expanding in scope to the disk stack (without hubs or shaft), then further to the extent of including the hubs and the shaft but only within a given section (e.g., treating the HPC and HPT rotor sections as distinct rotors), and up to an entire structure that rotates as a unit (which would include the HPC rotor, the HPT rotor, and the shaft all as a high speed rotor).

The example fore and aft hubs each have distal radially outwardly open shoulders mating with the adjacent disk. A tension shaft 130 holds the rotor under compression while the adjacent portion of the shaft is under tension. The example shaft 130 has an externally threaded forward end section 132 engaged to an internally threaded compartment 134 of the forward hub to transmit axial forces. The shaft 130 also has a second externally threaded portion 136 well aft thereof receiving a nut 138. The nut 138 holds a so-called kickstand portion (or inner hub) 140 of the aft hub 128 in axial compression to complete the compressive force transmission path through the rotor. The example aft hub 128 also has an outer hub or driving section 150 coupled to a corresponding forward portion 152 of the HPT rotor to allow the HPT rotor to drive rotation of the HPC rotor. In various embodiments, the shaft 130 may continue through to join with or become an HPT shaft. In the example shown, the hub 126 forward of the junction between the threaded sections 132 and 134 again becomes a portion of a high spool shaft and may mate with bearings, accessory drives, and the like.

The various disks have radially inboard protuberant bores 160 (FIG. 1) connected via thinner intermediate radial webs 162 to outer rim sections 164.

Figure 1A:
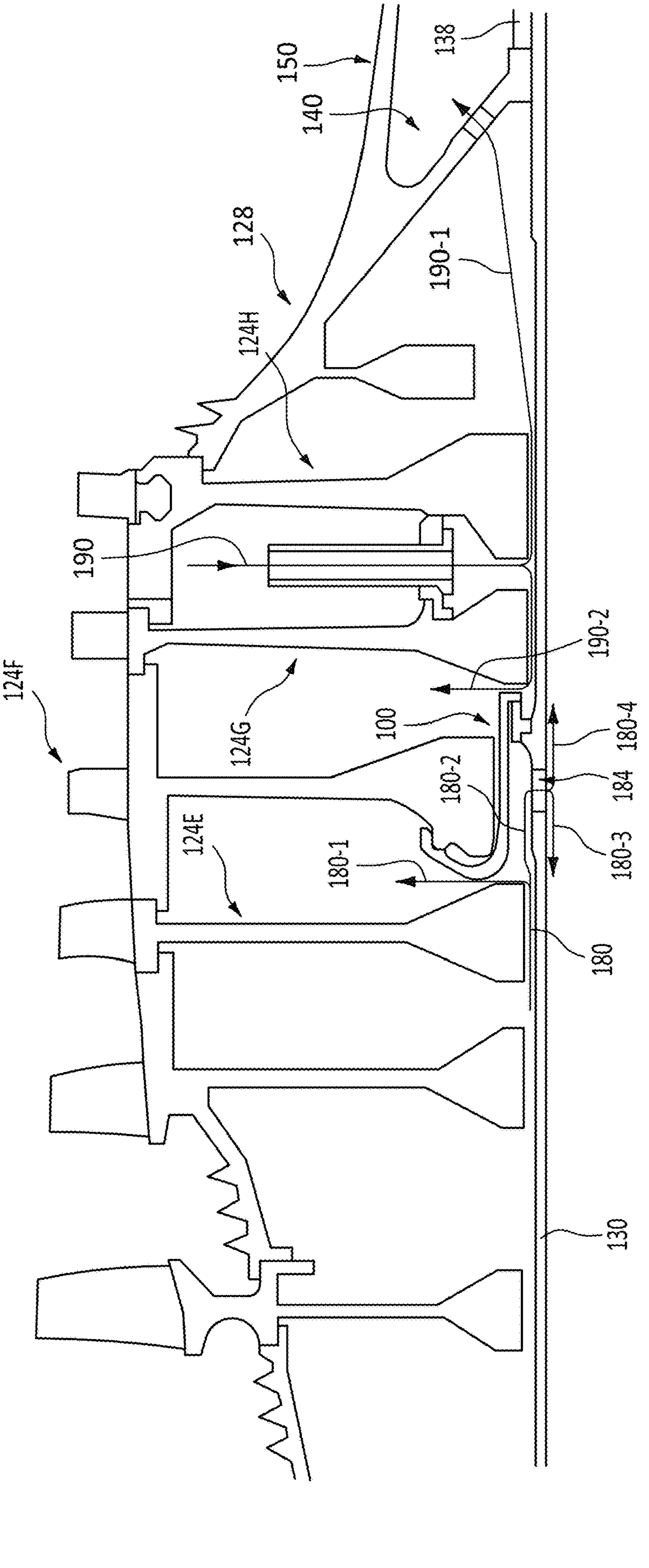
FIG. 1A is an enlarged view of the rotor of FIG. 1.

FIG. 1A shows a first leakage or bleed flow 180 from relatively upstream in the compressor passing several branches shown as 180-1, 180-2, 180-3, and 180-4. 180 passes between the ID surface of the bore of the disk 124E and the OD surface of the shaft 130 with 180-1 then passing radially outward between disks 124E and 124F for cooling and branch 180-2 passing through a circumferential array of apertures 184 in the shaft to then further branch into flows 180-3 and 180-4 (in an annular space between the shaft 130 and a low spool shaft (not shown) therewithin) with 180-3 then passing forward for forward bearing compartment buffering and 180-4 then passing aft for bearing compartment buffering. An additional leakage flow from yet downstream in the HPC is shown as 190. This passes radially inward between the disks 124G and 124H, then principally passing as a branch 190-1 between the bore ID surface of the disk 124H and the shaft OD surface to ultimately pass through a circumferential array of apertures in the inner hub/kickstand 140 for HPT cooling. The seal 100 isolates these flows from each other. A further branch 190-2 may pass forward between the bore ID surface of the disk 124G and the shaft OD surface to ultimately pass radially outward between the disks 124F and 124G to cool such disks.

Figure 1B:
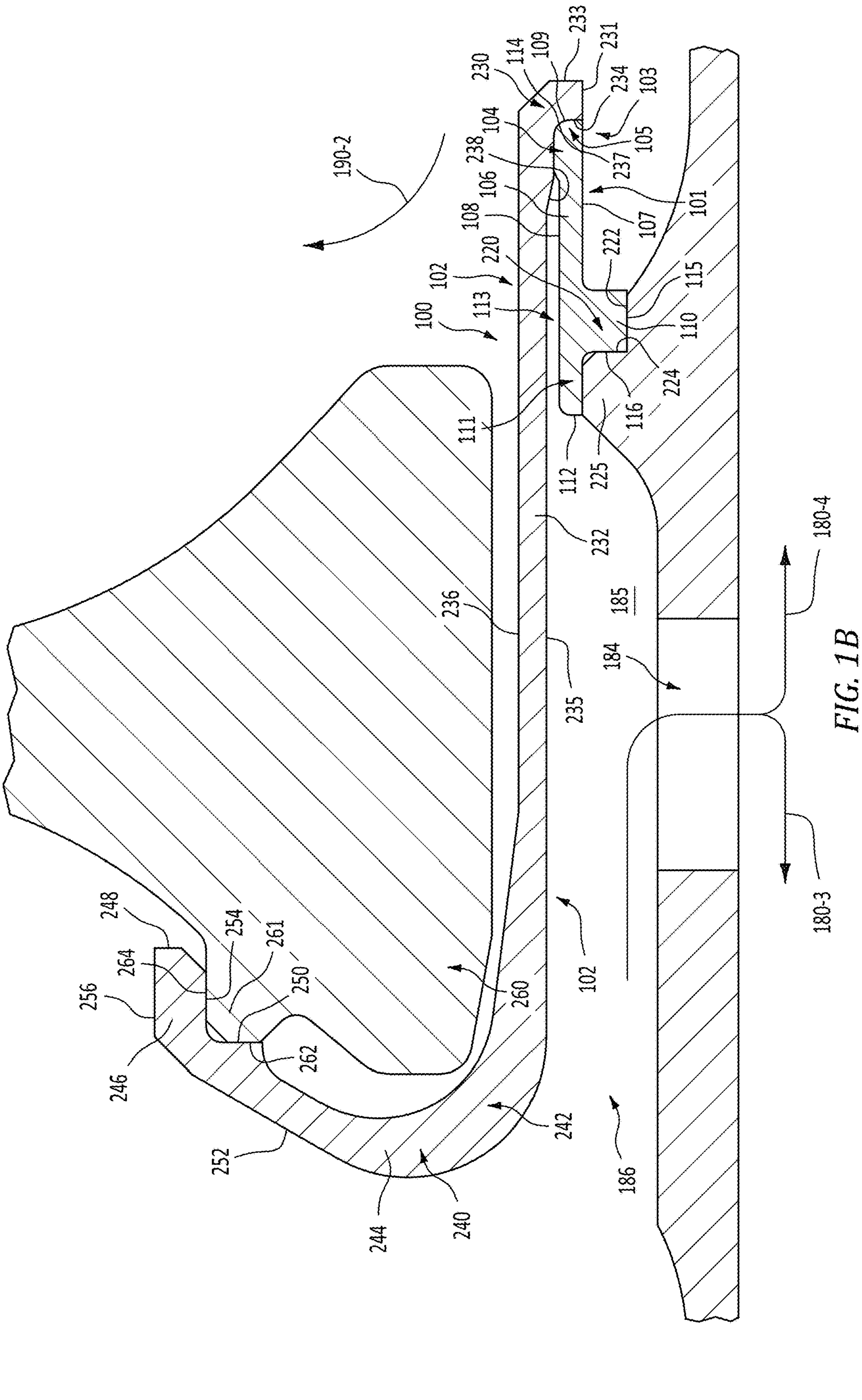
FIG. 1B is a further enlarged view of a seal region of the rotor of FIG. 1.

FIG. 1B shows an enlarged view of the seal 100 interactions with the shaft and the associated disk bore. As discussed below, the seal 100 is a two-piece seal having an inner piece 101 and an outer piece 102 meeting at a junction 103. The junction is of an aft region 104 of the inner piece received within an internal shoulder 105 of the outer piece 102 and in axial and radial contact therewith. As is discussed further below, the inner piece 101 has a sleeve section 106 terminating in the aft region 104 and having an inner diameter (ID) surface 107, an outer diameter surface 108, and an aft rim surface 109. The example first piece also has a radially inwardly projecting flange 110. The example inner piece sleeve section 106 also protrudes axially forward of the flange 110 with a section 111 extending to a forward rim 112. As is discussed further below, this protruding section 111 is optional. Additionally, as discussed below, along the aft region/section 104, the outer diameter surface 108 protrudes radially outward in a contact region with the outer piece 102. There is also a rounded transition 114 at a radially outer aft corner of the cross-section of the aft section/region 102.

Figure 2:
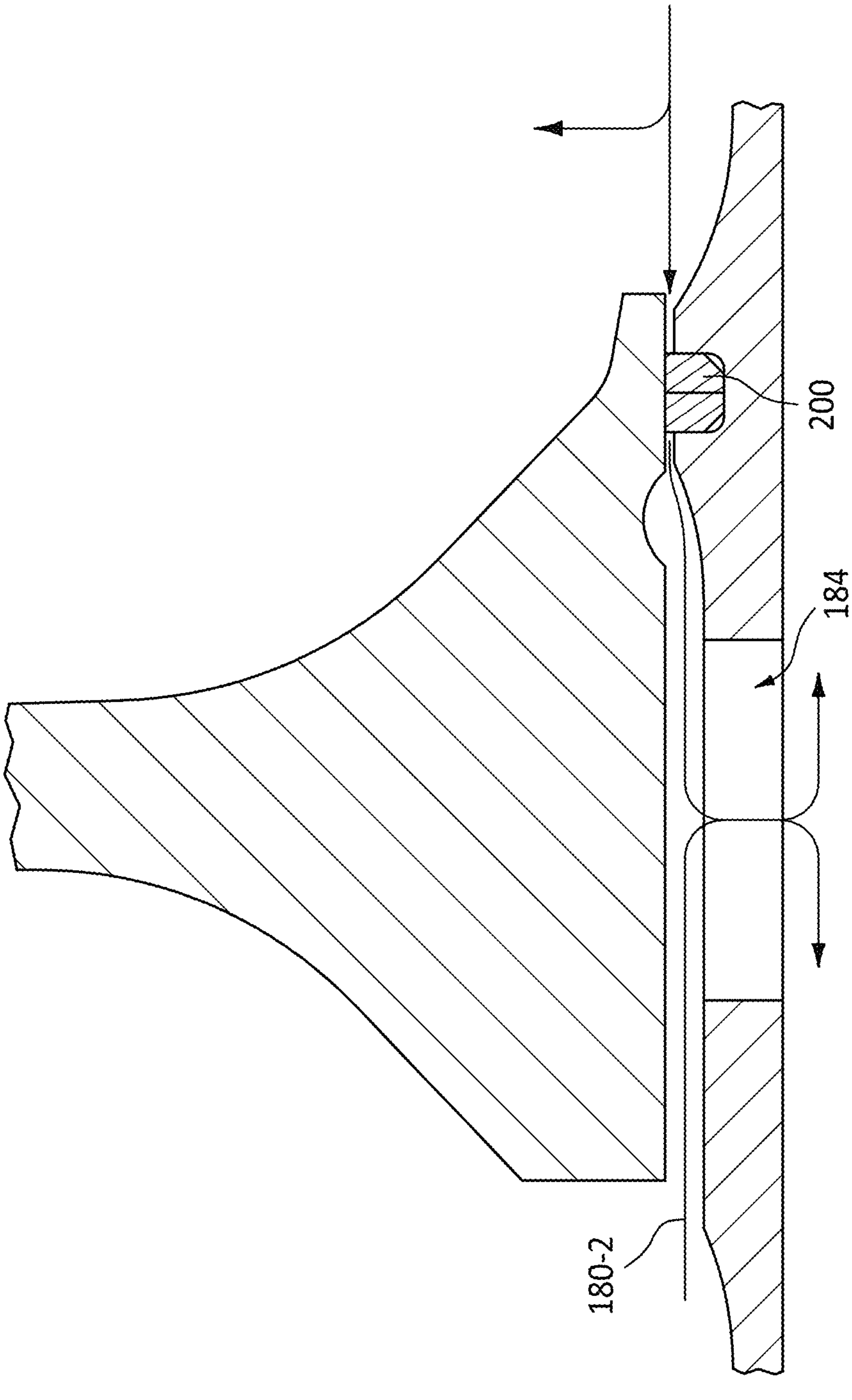
FIG. 2 (PRIOR ART)
FIG. 2 is a view of a prior art seal region.

FIG. 2 shows a hypothetical baseline seal as a piston seal ring 200 captured in a groove in the shaft and having an OD surface engaging an ID surface of the associated disk bore (e.g., in this case, a rearwardly extending foot). The seal 200 is a split ring seal. The split creates an asymmetric leakage flow (unnumbered branching off 190-2) through the seal split (e.g., shiplap joint). A number of proposals attempt to compensate for this by introducing additional leakage flows to mitigate the asymmetry. However, the additional leakage flows do not fully eliminate asymmetry and may reduce process efficiency.

The revised engine of FIG. 1B essentially removes the aft wall of the baseline shaft groove to create an aftward and radially outwardly open shoulder 220 having an ID surface 222 and a rearwardly facing forward surface 224 (of the former forward wall 225 which becomes an outward flange). This shoulder or shoulder compartment 220 thus receives the inwardly directed flange 110 of the seal 100 inner piece 101. The flange 110 extends inward from the sleeve section 106 and has an inward radial face 115 contacting the surface 222 and a radially-extending forward face 116 contacting the face 224.

The outer piece 102 has a radially inwardly directed flange 230 at the aft end of a sleeve section 232. The flange 230 has an inner diameter surface 231. The flange is at an aft rim 233 of the sleeve section 232 and seal outer piece. The flange has a forward surface 234 abutting the first piece aft rim surface 109. The sleeve section 232 has an inner diameter surface 235 and an outer diameter surface 236. In an aft region, the sleeve section inner surface protrudes slightly inward to contact the outer surface of the first piece along the aft region 104 and leave a radial gap 113 thereahead. FIG. 1B also shows a rounded transition between the surface 234 and the surface 235.

A forward end of the seal outer piece 102 is formed by a rearwardly open C-section channel 240. The channel has an inner section 242 merging with the sleeve 232, a radially outwardly extending web 244, and a rearwardly extending outer wall 246 extending to a rim 248. The web/wall 244 has an aft surface 250 and a forward surface 252. The outer wall 246 has an ID surface 254 and an OD surface 256. The disk bore has a forwardly protruding section 260 received in the channel with a forward rim section 262 of a protrusion 261 thereof contacting the surface 250 and an OD surface section 264 of the protrusion 261 contacting the surface 254. The contact between the surfaces 224/116 on the one hand and 250/262 on the other hand places the inner piece sleeve section 106 (between the flange 110 and junction 103) in axial compression and the outer piece sleeve section 232 in axial tension. It also applies a forward force to the shaft and a rearward force to the disk. This effectively creates a step-up in disk-to-disk forces from ahead of to behind the subject disk. The engagement between the seal and the shaft on the one hand and disk on the other hand may limit relative movement. This may limit wearing of surfaces. For example, a conventional PSR will tend to move radially outward in its groove to accommodate the relative radial displacement of the bore and to accommodate vibration, etc. In distinction, the seal 100 may flex. For example, with increasing speed, the sleeve 232 may cone slightly outward from aft to fore and the channel 240 may open radially slightly to accommodate relative radial displacement of the disk bore. Similarly, the inner piece sleeve 106 may also cone slightly outward from fore to aft causing a slight forward opening/divergence increase in the gap 113. The seal 100 thus forms the OD boundary of a plenum 185 with a forward annular inlet 186 and the holes 184 in an ID boundary formed by the shaft.

Figure 3:
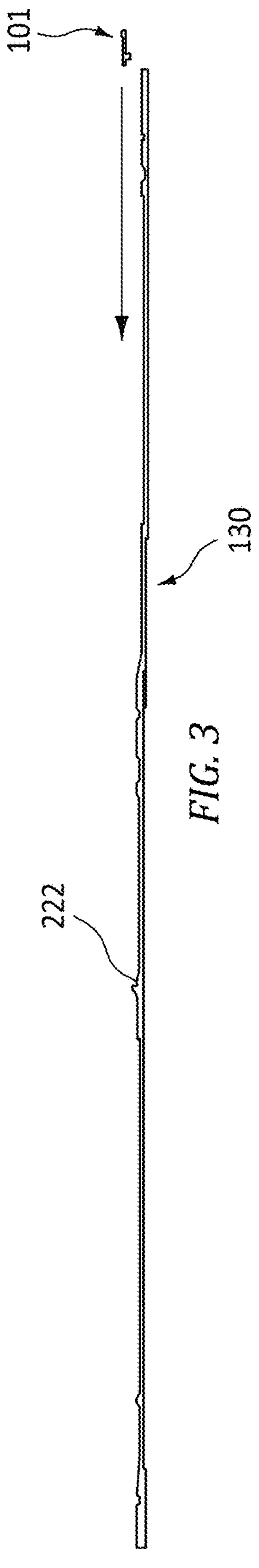
FIG. 3 is a view of a first stage of rotor assembly.

In contrast with a single piece seal wherein a shorter sleeve section 232 terminates in a flange taking the place of the inner piece and its flange 110, the example two-piece seal provide compliance advantages in that it extends the longitudinal length available for flexing. There still would be an increase even if the inner piece flange was relatively rigid/inflexible because the length of the sleeve 232 would nevertheless increase compared with the single-piece alternative. Additionally, as discussed further below, the two-piece configuration may create certain assembly advantages. The first piece may be pre-fitted to the shaft in a robust thermal interference fit. Similarly, the second piece may be pre-fitted to the disk bore in a thermal interference fit. Although the interference fit at the junction 103 may be a thermal interference fit, it need not be and may be a simple mechanical interference fit facilitated by a camming interaction during assembly due to the ramping profile transition 238 of the sleeve section 232 inner diameter surface. Robust radial interference fits at the shaft and bore may reduce or eliminate the possibility of leakage. Also, wear at these locations may be substantially eliminated. Reduce chance of wear of the bore or shaft reduces chances of an early demise to those parts or requiring their restoration. Wear, if any, may be limited to the junction 103. However, the seal 100 is replaceable. Robust interference fit FIG. 3 shows the seal 100 inner piece 101 being installed to the shaft 130. Example installation is a thermal interference fit translation. For example, the inner piece 101 may be preheated (e.g., furnace/oven) so that its ID flange ID surface 115 expands to clear the surface 222 as the translation brings the surfaces 236 and 224 (FIG. 1B) into contact. The inner diameter (ID) surface along the protruding section 111 may be dimensioned for clearance relative to the OD surface of the flange/wall 225. This protruding sleeve section 111 may serve to help guide installation over the wall/flange OD surface. In this example, even upon ultimate cooling, there remains clearance or at least a much lower level of interference than at the flange 115. In other embodiments, the protruding section 111 may be eliminated so that the sleeve section 106 co-terminates with the flange 115.

Figure 4:
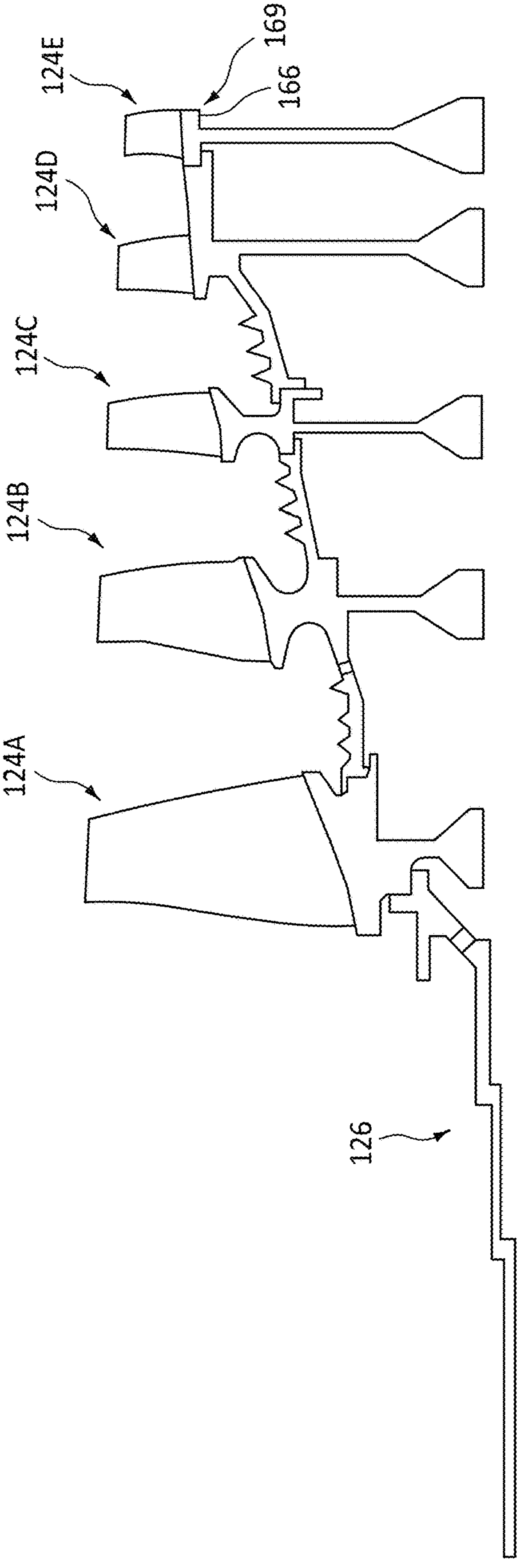
FIG. 4 is a view of an intermediate stage of rotor assembly.

Before, after, or in parallel with this seal installation, FIG. 4 shows the preassembly of the front hub 126 with the disks 124A-124E. The example disks may be sequentially installed via translation and thermal interference fitting. In one example, the nature of thermal interference fit depends on a particular orientation of the joints at the ends of the spacers. In the illustrated example, each sequential disk from 124A through 124E engages the prior disk with a radially inward facing shoulder surface of the added disk engaging an OD surface of the prior disk. Thus, each disk may be sequentially heated to expand prior to installation via translation. After the FIG. 4 subassembly is formed, the assembled seal inner piece 101 and shaft may be inserted and threaded into engagement.

Figure 5:
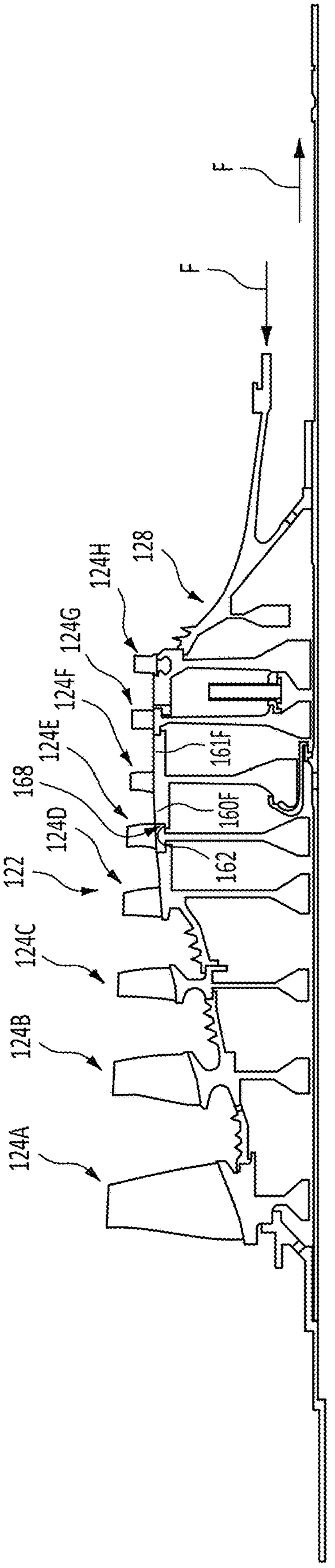
FIG. 5 is a view of a subsequent stage of rotor and shaft assembly.

As is seen in FIG. 5, the next disk 124F is the disk that bears the seal outer piece 102 that will engage the seal inner piece 101. Thus, the seal outer piece 102 may be preheated to radially expand the surface 254. The seal outer piece may then be mated to the disk with the protrusion 261 being received within the channel and the surfaces 254 and 264 aligning with each other. Allowing the outer piece to cool creates a radial thermal interference fit between the seal outer piece and the disk at the surfaces 264/254.

The example process avoids heating the disk 124F during assembly. The disk 124F has, at the end of its forward spacer 160F, a radially outwardly facing surface 162 (ID face of an interior shoulder 168) for engaging an aft underside region 166 (FIG. 4) of the rim of the disk 124E which is an ID face of an exterior radially outwardly open shoulder 169. Thus, installation of the disk 124F may be via translation while the disk 124E is still hot and expanded or, the disk 124E may be reheated. This then allows for thermal interference between the disks 124E and 124F when a more isothermal addition is reached (e.g., cooling to ambient temperature). This translation of the disk 124F causes initial engagement of the inner and outer pieces with the inner piece passing within the outer piece until the OD rounded rim transition 114 of the inner piece section 104 encounters the ID ramping section 238 of the outer piece sleeve 232 ID surface 235. This encounter creates a camming/wedging action radially expanding the outer piece and compressing the inner piece with insertion continuing until the inner piece becomes seated and the surfaces 109 and 234 abut.

After installation of the disk 124F, the remaining disks can be installed. Again, the disk 124G in the illustrated embodiment would be heated to expand its outer rim to be received in the radially outwardly open shoulder of the rear spacer 161F of the disk 124F. The disk 124H engages the underside of the rim of the disk 124G at the aft rim thereof. Thus, the disk 124H may be installed prior to the disk 124G cooling so as to provide an interference fit. In the illustrated example, the rear hub 128 has a radially outwardly open shoulder receiving an aft portion of the rear rim of the disk 124H. This may be a thermal interference fit or a mechanical interference fit.

The relative angling of the rear hub means that axial compression may tend to radially outwardly drive the forward rim thereof to engage the disk 124H thus obviating the need for thermal interference fit. However, if thermal interference fit is desired, the disk 124H may be heated to expand after it is installed to the disk 124G. There are, however, other possible combinations of heatings including forming yet further sub-assemblies (e.g., of two disks which are then installed as a unit).

Pre-tensioning is then provided by engaging the rear hub 128 with a fixture so as to provide a forward force while engaging an aft portion of the shaft to provide a tensile force (both shown as F being equal and opposite). This application of force drives the kickstand section 140 forward, whereupon the nut 138 may be tightened. Thereafter the force application may be released and fixtures disengaged allowing further assembly into an engine. The force release may bring the projection 260 end 22 into contact or firmer contact with the channel 240 surface 250 and may place the seal in axial tension.

In a disassembly situation for seal replacement, the parts may be disassembled in the reverse order as the assembly sequence. This may include force application to disengage the rear hub from the nut followed by nut unthreading and release of the force. Rear hub and sequential disk extraction may follow. Extraction of the disk 124F will be a forced extraction to overcome the interference between the inner 101 and outer 102 pieces. When all rotors and the tie-shaft are removed, the outer piece 102 will still be engaged to the disk 124F and the inner piece 101 will still be engaged to the shaft. So the last step is to remove the members from the respective disk and shaft by applying an extraction load on one member and a reaction load on the interfacing disk or shaft. Access to the pieces for this last step may facilitate heating (e.g., heat gun or induction) of the pieces to case extraction without damage to mating surfaces.

Additional variations may include the use of coatings for various purposes including case of assembly, environmental protection, hard facing, or lubricity.

Component materials and manufacture techniques and assembly techniques may be otherwise conventional. Additionally, the seal pieces may be manufactured by forging followed by machining. Example materials are nickel-based alloys or superalloys such as IN-718.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline engine or rotor configuration, details of such baseline may influence details of particular implementations. Accordingly, other embodiments are within the scope of the following claims.

What is claimed is:

1. A turbine engine rotor comprising:
a central shaft; and
a disk stack having a plurality of disks encircling the shaft,
and further comprising a seal having:
a first member having, in central axial cross-section:
a rearwardly-open channel receiving a portion of one disk of the plurality of disks;
a sleeve extending rearward from the channel and between the one disk and the shaft; and
a portion extending radially inward from the sleeve and having a forward surface; and
a second member having, in central axial cross-section:
a forward-facing surface contacting an aft-facing surface of the shaft; and
a rear-facing surface contacting the forward surface of said portion extending radially inward from the sleeve.

2. The turbine engine rotor of claim 1 wherein:
the shaft has a plurality of through-holes axially within a span of the sleeve.

3. The turbine engine rotor of claim 1 wherein:
the shaft is under axial tension;
the seal first member is under axial tension; and
the seal second member is under axial compression.

4. The turbine engine rotor of claim 1 wherein:
a rear face of a radial web of the channel contacts the one disk.

5. The turbine engine rotor of claim 4 wherein:
an inner diameter face of an outer diameter wall of the channel contacts the one disk.

6. The turbine engine rotor of claim 1 wherein:
the second member rear facing surface is on a second member sleeve portion; and
the second member forward facing surface is on a second member flange extending radially inward from the second member sleeve portion and in radial interference fit with the shaft.

7. The turbine engine rotor of claim 6 wherein:
the second member sleeve portion has a section forward of the second member flange and not in radial interference with the shaft.

8. The turbine engine rotor of claim 1 wherein:
each of the seal first member and second member is a non-split full annulus.

9. A gas turbine engine including the turbine engine rotor of claim 1 wherein the rotor is a high pressure compressor rotor and further comprising:
a high pressure turbine rotor co-spooled with the high pressure compressor rotor on a high spool;
a low spool comprising a low pressure compressor rotor and a low pressure turbine rotor;
a combustor; and
a gaspath sequentially through the low pressure compressor, high pressure compressor, combustor, high pressure turbine, and low pressure turbine.

10. A method for assembling the turbine engine rotor of claim 1, the method comprising:
assembling the seal second member to the shaft;
assembling a forward plurality of the disks to each other to form a forward substack;
assembling the forward substack to the shaft;
assembling a rearward plurality of the disks to each other and the forward substack and shaft, including assembling the seal first member to said one disk being a forwardmost disk of the rearward plurality, to form a rearward substack including said one disk; and
stretching the shaft to draw the seal to bear against the one disk.

11. The method of claim 10 wherein:
the assembling the seal second member to the shaft comprises radial thermal interference fitting.

12. The method of claim 11 wherein:
the assembling the rearward plurality of the disks to each other and the forward substack and shaft comprises:
said assembling the seal first member to said one disk followed by sequential installation of the rearward plurality of disks to the preassembled forward substack and shaft; and
the assembling the rearward plurality of the disks to each other and the forward substack and shaft comprises thermally expanding the seal first member to receive the received portion of the one disk.

13. A method for using the turbine engine rotor of claim 1, the method comprising:
driving rotation of the rotor; and
the driving increasing a radial contact pressure between an inner diameter face of an outer diameter wall of the rearwardly-open channel and the received portion of the one disk.

14. The method of claim 13 further comprising:

the inner piece and the outer piece radially flexing to accommodate radial expansion of said one disk relative to the shaft.

15. A turbine engine rotor comprising:

a central shaft; and a disk stack having a plurality of disks encircling the shaft and held in compression by tension in the shaft, and further comprising:

means for sealing between the shaft and a disk of the disk stack and applying axial bias between the shaft and the disk, the means comprising an inner piece and an outer piece wherein:

the outer piece comprises a sleeve passing between an inner diameter surface of the disk and the shaft and axially overlapping a circumferential array of vent holes in the shaft;

the inner piece extends aft from the shaft to a junction with the outer piece; and the outer piece extends forward from the junction with the inner piece to a junction with said disk.

16. The turbine engine rotor of claim 15 wherein one or more of:

the rotor is a high pressure compressor rotor of a multi-spool engine;

the axial bias draws said disk rearward; and the means provides an inward radial tension on the disk increasing with rotational speed.

17. The turbine engine rotor of claim 15 wherein:

the rotor is a high pressure compressor rotor of a multi-spool engine;

the axial bias draws said disk rearward; and the means provides an inward radial tension on the disk increasing with rotational speed.

18. A turbine engine rotor seal comprising a two-piece metallic body encircling a central longitudinal axis wherein:

an outer piece has in central longitudinal half section:

a first axial end and a second axial end;

a channel at the first end and open axially toward the second end;

a sleeve extending from the channel; and a portion extending radially inward from the sleeve and having a first surface facing toward the first axial end;

an inner piece has in central longitudinal half section:

a sleeve having a first axial end and a second axial end, the inner piece sleeve second axial end contacting said first surface; and a portion extending radially inward from the inner piece sleeve; and an axial direction from the outer piece first axial end to the outer piece second axial end is the same as an axial direction from the inner piece sleeve first axial end to the inner piece sleeve second axial end.

19. The turbine engine rotor seal of claim 18 wherein:

the channel extends radially outward from the outer piece sleeve; and/or the inner piece is entirely radially surrounded by the outer piece.

* * * * *